March 14, 1967  S. V. PUIDOKAS  3,308,682
DIFFERENTIAL GEAR ASSEMBLY
Filed Oct. 23, 1964

Inventor:
STANLEY V. PUIDOKAS
By Carl J. Barbee
Attorney

United States Patent Office 3,308,682
Patented Mar. 14, 1967

3,308,682
DIFFERENTIAL GEAR ASSEMBLY
Stanley V. Puidokas, Kenosha, Wis., assignor to American Motors Corporation, Kenosha, Wis., a corporation of Maryland
Filed Oct. 23, 1964, Ser. No. 405,965
3 Claims. (Cl. 74—607)

This invention relates generally to a differential gear assembly for a vehicle and more particularly to an improvement in providing the desired preload on the bearings of the drive shaft pinion of the assembly.

The conventional non-locking differential gear assembly for a vehicle includes a case rotatably mounted in the assembly housing. The case, in turn, contains rotatably mounted differential pinions and differential side gears for engagement with the axle shafts. Fixedly secured to the exterior of the case is a ring gear. Engaging and driving the ring gear and thus the case is a drive pinion. The pinion is located on one end of the pinion shaft and is generally integral therewith. The other end of the shaft extends outside the housing and by virtue of splines located thereon is adapted to be engaged and driven through a conventional universal joint. Between the pinion and the splined end of the shaft are positioned roller bearings which rotatably support the pinion shaft in the housing. Shims are used between the housing and the bearing cup adjacent the pinion to assure proper mating of the pinion and ring gear.

The pinion shaft bearings are preloaded to compensate for expansion due to heat and loads of operation. This is accomplished by the use of a pinion nut in conjunction with shims which are located between the shaft shoulder and the inward side of the cone of the roller bearing that is adjacent the splined end of the pinion shaft. A thrust washer and a lock washer are located between the roller bearing cone and the pinion nut on the pinion shaft. Both washers have flat internal surfaces that engage a suitable flat in the threaded portion of the pinion shaft to prevent relative rotative motion therebetween. After the tightening of the nut on the shaft thread with a torque wrench, a tool is then placed on the vertically positioned shaft to measure the amount of torque needed to turn the pinion shaft in the housing. If the preload is too high, the shim thickness is increased and if too low, the shim thickness is decreased. At the desired preload, one or more of the several ears of the lockwasher are bent over the hex surface of the nut to lock same to the pinion shaft. The balance of the differential gear assembly is then installed.

While the above noted assembly operates in fairly satisfactory fashion, it has been noted that the lockwasher in association with the pinion nut does not always locate the nut in the exact position of the desired preload. That is, the ear or ears of the washer do not consistently fit tightly to the nut and also the lockwasher itself moves on the shaft until restrained by the aforementioned flat surface. Consequently, the nut moves relative to the shaft during vehicle operation until all the clearance has been exhausted before being restrained by the lockwasher. The preload on the bearings is thus not the same as originally obtained. Further, the machining of a flat on the pinion shaft thread, the provision for a thrust and a lockwasher and the adjusting of shims substantially increases the cost of the assembly.

Applicant has developed a differential gear assembly that eliminates the above noted disadvantages. Applicant has replaced the preload shims for the shaft bearings with a collapsible spacer to account for manufacturing tolerances. Applicant also has eliminated the flat on the shaft, the lockwasher and the standard nut and replaced same with a soft nut of unique design. The nut has an annular flange on the end thereof opposite the bearing. This flange is adapted to be compressed at preferably three circumferentially spaced places by a staking fixture to lock the nut to preferably the splined shaft at precisely the point of desired preload as determined by the torque measuring tool. The nut can also be removed from the hard shaft, when desired, and used again.

It is, therefore, an object of this invention to provide a new and improved differential gear assembly.

Another object of this invention is to provide a differential gear assembly that permanently provides the desired preload on the bearings of the drive shaft pinion of the assembly.

Another object of this invention is to provide a differential gear assembly that can be produced at less cost.

Another object of this invention is to provide a staking nut adapted to be secured to the drive shaft pinion of a differential gear assembly to permanently provide the desired preload on the shaft bearings.

Another object of this invention is to utilize the available, axial driving splines as the medium for effecting the locking of the staking nut in the desired circumferential location on the pinion shaft to preserve the desired bearing preload condition.

Other objects and advantages will become apparent from the following description in conjunction with drawings in which.

Figure 1:
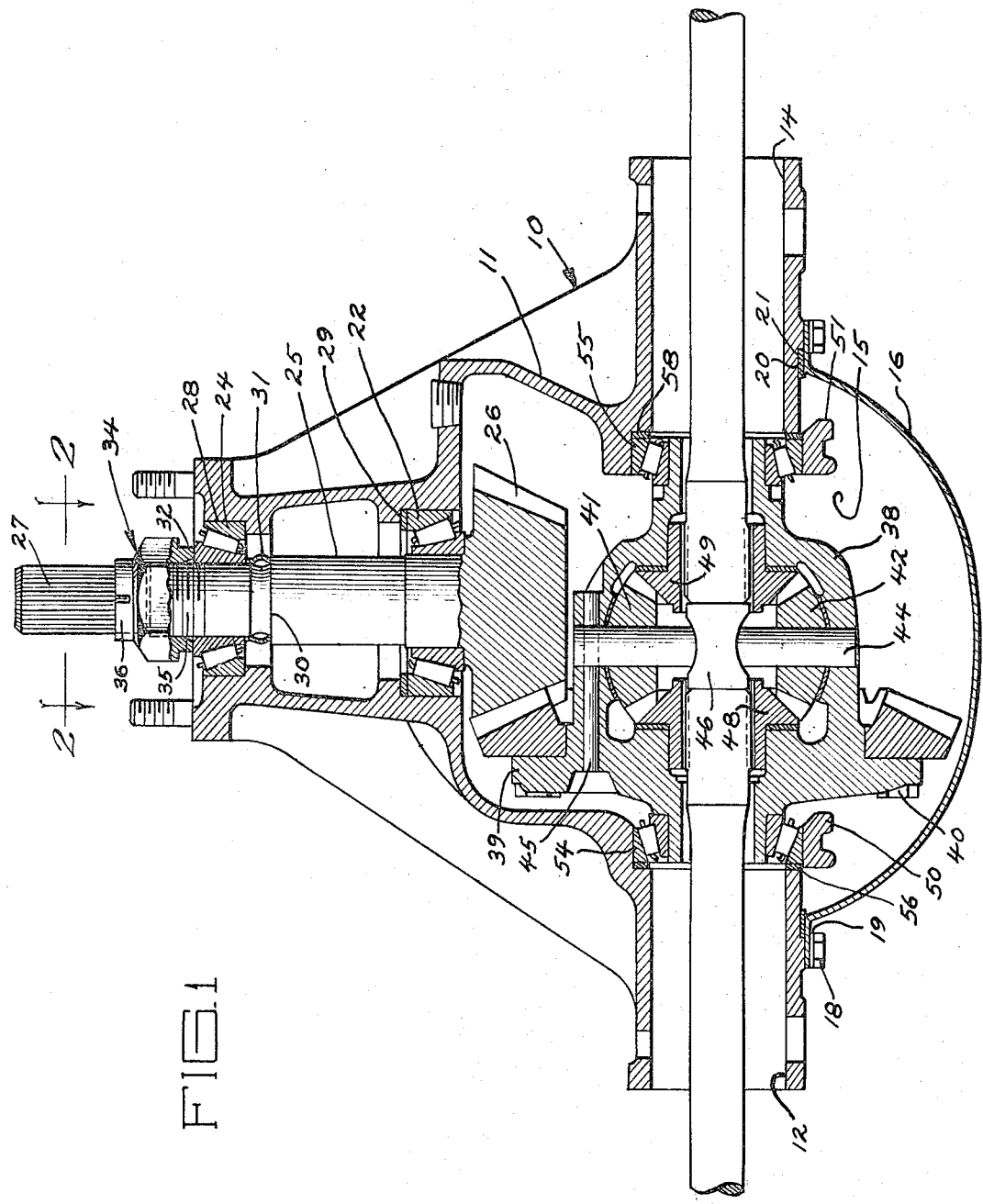
FIGURE 1 is a top section of the differential gear assembly of this invention.
Figure 2:
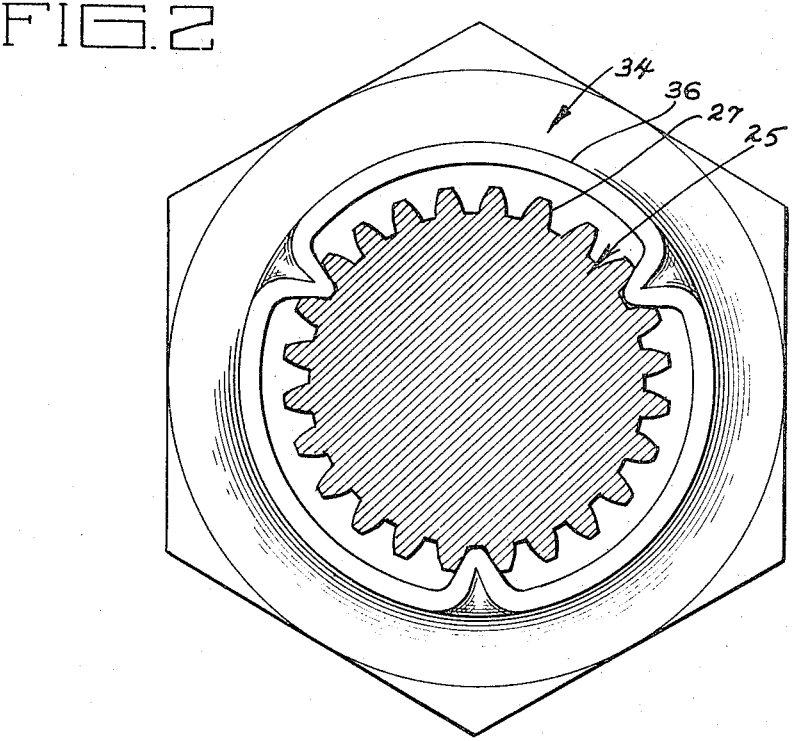
FIGURE 2 is an enlarged vertical section taken along line 2—2 of FIGURE 1, with housing omitted.

Referring to FIGURES 1 and 2, 10 indicates generally a vehicle differential gear assembly. Assembly 10 includes a hollow differential gear housing 11. Housing 11 has a pair of generally opposed entrances 12 and 14 for the installation therein of conventional axle tubes (not shown). Housing 11 has a large opening 15 for the installation therein of the moving components of the assembly. Closing the housing opening 15 with metal-to-metal contact with the housing is cover 16. Capscrews 18 and lockwashers 19 secure cover 16 to housing 11. Gasket 20 compressed in gasket seat 21 by cover 16, seals the opening preventing leakage of lubricant therethrough.

Rotatably supported in housing 11 by spaced roller bearings 22 and 24 is pinion shaft 25 which is installable through opening 15 before the assemblage of cover 16 to housing 11. Pinion shaft 25 has a pinion gear 26 on one end thereof located inside housing 11 and axial splines 27 on the other end which extends outside the housing through housing aperture 28 for connection to a conventional joint (not shown). Located between the housing seat for the cup or outer race of roller bearing 22 outward of the bearing are locating shims 29. Shims 29 provide optimum engagement between pinion 26 and the driven member of the assembly. Outward of roller bearing 22 and located between annular shoulder 30 of shaft 25 and cone of roller bearing 24 is collapsible spacer 31, and in the form of a sleeve encircling the pinion shaft. On the outer side of the cone or inner race of roller bearing 24 and in contact therewith is boss 32 of staking nut 34. Staking nut 34 engages external thread 35 on shaft 25 which is located inward of splined end 27 of the shaft. Staking unt 34, torqued onto shaft threads 35, secures shaft 25 in housing 11 against collapsible spacer 31 which compensates for manufacturing tolerances.

With the sub-assembly as detailed thus far positioned in such a manner as to place pinion shaft 25 in a vertical position to eliminate the effect of gravity, the amount of torque to turn shaft 25 in housing 11 is measured. If the preload on bearings 22 and 24 for compensating for heat and loads of operation is too great, the nut 34 is threaded outward from contact with the cone of bearing 24. If too low, the nut is tightened further against bearing 24. At precisely the desired preload, a crimping tool compresses circumferential flange 36 of staking nut 34 in preferably three places into engagement with preferably the grooves between adjacent axial splines of shaft 25 to lock nut 34 on shaft 25. It is to be understood that the nut 34 could also be locked in the thread 35 but axial splines 27 provide a more positive stop and thereby acquire a function in addition to engaging a universal joint. Staking nut 34 is made of a soft material as compared with hard shaft 25 and can be used repeatedly upon assembly and disassembly of assembly 10.

After installation of the pinion shaft 25 with the desired preload on bearings 22 and 24 in assembly 10, the balance of the moving components of the assembly are installed through opening 15. Specifically differential gear case 38 with ring gear 39 attached thereto by capscrews 40 is located in housing 11 so that the ring gear 39 meshes with pinion 26. Located in case 38 are differential pinion gears 41 and 42 spacedly mounted on differential pinion shaft 44 which is locked in case 38 by pin 45. Spaced apart by thrust block 46 are differential side gears 48 and 49 rotatably mounted in case 38 and meshing with differential pinion gears 41 and 42. Side gears 48 and 49 have internal splines adapted to engage and drive axle shafts installable through inlets 12 and 14.

Bearing caps 50 and 51 attached to housing 11 by capscrews, secure by virtue of roller bearings 54 and 55, case 38 in housing 11. Shims 56 and 58 are installed between cups of bearings 54 and 55 to eliminate side play of case 38 in housing 11. As mentioned previously, cover 16 and gasket 20 close opening 15 and seal same completing the differential gear assembly.

Figure 3:
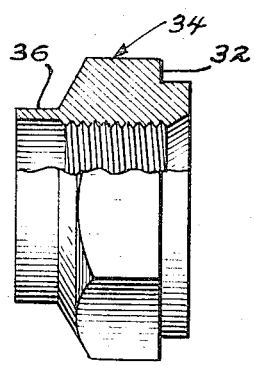
FIGURE 3 is a side view of the staking nut of this invention.
Figure 4:
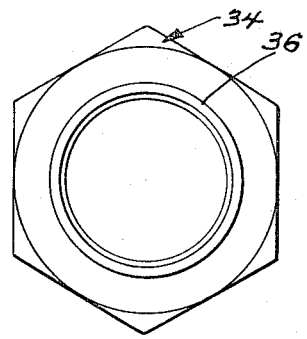
FIGURE 4 is an end view of the staking nut of this invention.

FIGURES 3 and 4 illustrate the details of the unique, soft staking nut 34 which contributes to the improved differential gear assembly. Nut 34 has preferably a hex exterior adapted for engagement by a torque wrench. Also boss 32 is of suitable dimension to correctly contact the bearing cone of bearing 24. Peripheral flange 36 is adapted to be engaged and bent so as to effect projections between adjacent splines 27 by a crimping tool without rotative movement of the nut 34 relative to pinion shaft 25.

From the foregoing, it is readily apparent that the desired preload on the pinion shaft bearings 22 and 24 can be achieved and maintained by use of a unique staking nut in conjunction with spacer 31. The result is a new and improved and more economical, differential gear assembly. The economy resulting from the elimination of the heretofore flat in the shaft thread, a thrust washer lockwasher and the preload shimming operation.

Having thus described the invention, it will be apparent to those skilled in the art that various modifications and changes can be made without departing from the spirit of the invention or the scope of the appended claims.

I claim:
1. A differential gear assembly comprising:
 (a) a housing defining a chamber having an exit;
 (b) a case rotatably mounted in the housing chamber;
 (c) differential gears mounted in the case;
 (d) a ring gear secured to the exterior of the case;
 (e) said housing having spaced bearing seats;
 (f) bearings having outer races received in the bearing seats;
 (g) a pinion shaft;
 (h) inner races for the bearings and mounted on the pinion shaft;
 (i) a pinion gear at one end of the pinion shaft and engaging the ring gear;
 (j) external threads on the pinion shaft;
 (k) external splines on the pinion shaft adjacent to the external threads, said splines extending axially of the pinion shaft;
 (l) means for drawing the inner races of the bearings axially toward each other thereby establishing a pre-determined pre-load condition on the bearings, said means including a nut having internal threads at one end, threaded onto the pinion shaft threads, said nut having a circumferential flange at its other end, said flange overlying the shaft splines;
 (m) means for locking the nut on the shaft threads to maintain the pre-determined pre-load condition on the bearings, said means including circumferentially spaced projections formed on the nut flange and extending into the grooves between adjacent splines.

2. A differential gear assembly comprising:
 (a) a housing defining a chamber having an exit;
 (b) a case rotatably mounted in the housing chamber;
 (c) differential gears mounted in the case;
 (d) a ring gear secured to the exterior of the case;
 (e) said housing having spaced bearing seats;
 (f) bearings having outer races received in the bearing seats;
 (g) a pinion shaft;
 (h) inner races for the bearings and mounted on the pinion shaft;
 (i) a shoulder formed on the pinion shaft;
 (j) a sleeve type spacer encircling the pinion shaft and having one of its ends engaged by an inner bearing race and its other end engaging the shaft shoulder;
 (k) a pinion gear at one end of the pinion shaft and engaging the ring gear;
 (l) external threads on the pinion shaft;
 (m) external splines on the pinion shaft adjacent to the external threads, said splines extending axially of the pinion shaft;
 (n) means for drawing the inner races of the bearings axially toward each other thereby establishing a pre-determined pre-load condition on the bearings, said means including a nut having internal threads at one end, threaded onto the pinion shaft threads, said nut having a circumferential flange at its other end, said flange overlying the shaft splines;
 (o) means for locking the nut on the shaft threads to maintain the pre-determined pre-load condition on the bearings, said means including circumferentially spaced projections formed on the nut flange and extending into the grooves between adjacent splines.

3. A differential gear assembly as set forth in claim 2 wherein the housing has an annular shoulder and a shim is interposed between such shoulder and one of the outer bearing races to position the pinion gear relative to the ring gear.

References Cited by the Examiner

UNITED STATES PATENTS

| | | |
|---|---|---|
| 178,086 | 5/1876 | Spafford. |
| 362,742 | 5/1887 | Hatch. |
| 721,497 | 2/1903 | Bigelow _____ 151—21 |
| 1,063,146 | 5/1913 | Zitzerman _____ 151—21 X |
| 1,298,469 | 3/1919 | Young et al. |
| 2,243,515 | 5/1941 | Van Sant _____ 151—21 |
| 2,548,258 | 4/1951 | Griffith _____ 74—607 X |
| 2,735,315 | 2/1956 | Zenker _____ 74—607 |
| 2,788,044 | 4/1957 | Dock _____ 151—21 |
| 2,895,315 | 7/1959 | Fishtahler. |

MARK NEWMAN, *Primary Examiner.*

DAVID J. WILLIAMOWSKY, *Examiner.*

J. A. WONG, *Assistant Examiner.*